United States Patent [19]

Boardman

[11] 4,277,357

[45] Jul. 7, 1981

[54] HEAT OR COLD STORAGE COMPOSITION CONTAINING A HYDRATED HYDRAULIC CEMENT

[75] Inventor: Bryan J. Boardman, Chadds Ford, Pa.

[73] Assignee: Boardman Energy Systems Incorporated, Wilmington, Del.

[21] Appl. No.: 117,042

[22] Filed: Jan. 31, 1980

[51] Int. Cl.$^3$ .............................................. C09K 5/06
[52] U.S. Cl. ...................................... 252/70; 126/400
[58] Field of Search ........................... 252/70; 126/400

[56] References Cited

U.S. PATENT DOCUMENTS 2,677,664   5/1954   Telkes ..................................... 252/70

FOREIGN PATENT DOCUMENTS 2828086   10/1979   Fed. Rep. of Germany ............. 252/70

*Primary Examiner*—Harris A. Pitlick
*Attorney, Agent, or Firm*—John G. Abramo

[57] ABSTRACT

A polyphase composition for the storage of heat or cold utilizing the latent heat of fusion of a salt hydrate continuous phase intimately intermixed with a hydrated hydraulic cement continuous phase and wherein said continuous phases are optionally in contact with a discontinuous crystalline phase comprising a nucleating component and wherein the composition is enveloped, contained, or packaged within a vapor impermeable material.

87 Claims, No Drawings

HEAT OR COLD STORAGE COMPOSITION CONTAINING A HYDRATED HYDRAULIC CEMENT

BACKGROUND OF THE INVENTION

The invention relates to structures and compositions for the efficient storage of heat or cold by controlling the absorption or emission of thermal energy by certain salt hydrates at their melting point.

There is a great deal of interest in phase change thermal energy storage systems at the present time due in part to the ability of these materials to store large amounts of heat or cold by means of their latent heat of fusion and heat of crystallization exhibited during phase changes of these materials.

It is well known that the latent heat capacity of a material during melting is much greater than the specific heat capacity per degree due to a temperature change of either the solid heat storage material prior to melting or the resulting liquid after all of the material has melted. Heat is evolved when the melted salts are cooled through their melting point and the heat energy from the heat of crystallization is recovered. Heat is absorbed when the crystallized salts are heated through their melting point and their heat of fusion is absorbed.

Salt hydrates tend to supercool, i.e., they sometimes remain liquid when the melted salt hydrate is cooled below its melting temperature. The amount of heat recovered in that circumstance is equal to the specific heat capacity per degree, i.e., the energy emitted when the temperature of the supercooled liquid is lowered and does not include the heat of crystallization. Nucleating agents, which induce crystallization, have been described to avoid this problem. Borax, otherwise known as sodium tetraborate decahydrate, is described in U.S. Pat. No. 2,677,664 issued May 4, 1954, to Telkes as a suitable nucleating agent for use with sodium sulfate decahydrate.

Another problem with many salt hydrates, particularly those based on inexpecsive Glauber's salt (sodium sulfate decahydrate), is that when they melt and thereby undergo phase transition, a liquid/solid mixture is formed, which separates into a heterogeneous mixture. For example, sodium sulfate decahydrate, after repeated heating and cooling, develops three distinct phases involving anhydrous sodium sulfate in one layer, sodium sulfate decahydrate in another layer, and an aqueous solution of sodium sulfate in a third layer. This leads to inefficiency in the heat or cold storage system, because the largest heat or cold storage capacity is obtained from the decahydrate, which does not completely re-form from the heterogeneous mixture.

Telkes, in U.S. Pat. No. 3,986,969, issued Oct. 19, 1976, describes a method for preventing the phase separation and supercooling of sodium sulfate decahydrate by mixing the salt hydrate and a nucleating agent together, then suspending them in a thixotropic mixture. In this highly divided form, it is believed that the problem caused by phase separation is minimized. However, thixotropic mixtures will eventually separate on heat cycling.

Laing, in U.S. Pat. No. 3,720,198, issued Mar. 13, 1973, described heat storage substances that are dispersed with the aid of "body forming" materials which are fused in place. An intergal aspect of that process involves the uniform dispersion of a nucleating agent such as borax in the heat storage substance throughout the material. These materials are formed by mixing the nucleating agent with the heat storage substance and the "body forming" material, pressing the materials into the desired form and then sintering, but are impractical or impossible to manufacture or fail to prevent separation after repeated heat and cold cycling.

SUMMARY OF THE INVENTION

The present invention is a composition comprising suitable latent heat storage salt hydrates having a heat of fusion greater than 16 gram calories per gram (67 joules per gram) intimately intermixed with hydrated hydraulic cement. Optionally, a nucleating agent is incorporated within the composition during or after formation of the basic composition.

The process of manufacturing the composition comprises:

a. Mixing together anhydrous hydraulic cement, anhydrous latent heat storage precursor, and water to form a suspension; b. mixing said suspension with cooling until enough hydration of cement and latent heat storage precursor has taken place so that suspended components will remain suspended when mixing is stopped; c. transferring the suspension into a vapor impermeable package, envelope, or container; d. hermetically sealing the vapor impermeable package, envelope, or container.

The composition may be produced in various shapes such as bricks, rods, or plates and may also include metal fibers to increase the thermal conductivity of the composition. Admixtures may also optionally be included.

DESCRIPTION OF THE INVENTION

The term, "salt hydrate", as used herein, is meant to include single salt hydrates, mixed salt hydrates, and eutectic mixtures all of which have a high latent heat of fusion, i.e., those with a latent heat of fusion greater than 16 g. cal. per gram (67 joules per gram). These salt hydrates may be used for the storage of heat or cold depending on the system in which they are used.

The mixing of salt hydrates suitable for the storage of heat or cold, with hydraulic cement and water and allowing the mixture to harden, thereby forming a heat or cold storage composition with a congruent melting temperature, has not previously been disclosed. The composition may be prepared by mixing a salt hydrate and/or a precursor anhydrous salt with the required amount of anhydrous hydraulic cement, along with the required amount of water necessary for the hydration of the hydraulic cement and precursor anhydrous salt to form a suspension of all the ingredients. The suspension is then transferred into a suitable container, after which said containers are hermetically sealed. The composition hardens by way of hydration of the hydraulic cement component at which time the salt hydrates, any anhydrous salt and salt solution, and the hydraulic cement each form a continuous phase. Under a microscope, an interconnected network of salt hydrates and an interconnected network of hydrated hydraulic cement are observed. The salt hydrate and hydraulic cement are intimately intermixed such that the salt hydrate component is maintained in the composition essentially without deterioration of the capacity of the salt hydrate component to store heat or cold during repeated heating or cooling cycles above and below the melting point of the salt hydrate. The transfer of heat or heat energy into the composition causes the salt hydrate phase to undergo melting and thereby store heat energy. The transfer of heat or heat energy out of the composition causes the salt hydrate phase to undergo crystallization and thereby store cold.

The composition may be prepared successfully with salt hydrate in a completely molten form, a semimolten form, or a completely crystalline form. Preferably, the composition is prepared with about 30 percent (30%) crystallized salt hydrate in equilibrium with the melted or molten form during the manufacturing process. The presence of the crystallized salt hydrate within the mix after the mixing is stopped and during the transferring process or while the composition sits in the containers or molds, before the composition hardens, aids in the prevention of settling out of any anhydrous salt, salt hydrate, or cement particles. Stated differently, if too little of the salt hydrate crystals are formed in the mix before transferring into suitable containers or molds or after the mixing process is stopped, some of the anhydrous salt, salt hydrate, and cement particles may settle out before the composition hardens. If too large a percentage of salt hydrate crystals are present within the mix before transferring into suitable containers or molds, then the solids content may be too high to allow easy transfer of the composition from the mixing vessel.

Methods for the conversion of salt hydrate melts (warm precursor anhydrous salts and solution) into the desired salt hydrate crystals include the cooling of the mixing vessel during mixing of the melt thereby cooling the melt which brings about the crystallization of the salt hydrate, or by placing a heat exchanger in contact with the melt during mixing to extract heat of crystallization from the melt. These methods do not provide a foolproof method of controlling the exact amount or the uniformity of salt hydrate crystals in equilibrium with the salt hydrate melt. If the heat exchange rate varies due to a variation of coolant flow or coolant temperature then the rate of formation of said hydrate crystals will also vary. Continual testing of the mixture for the percentage of crystallized salt hydrates must be carried out so that the cooling of the mixing vessel or heat exchanger can be stopped as soon as the desired percentage of salt hydrate crystals in equilibrium with salt hydrate melt is present. Another disadvantage to the formation of salt hydrate crystals from salt hydrate melts by the hereinbefore mentioned methods, such as the cooling of the mixing vessel during mixing of the melt or by placement of a heat exchanger within the melt during mixing to extract heat of crystallization from the melt, is that the salt hydrate crystals tend to grow on and form an incrustation over the surfaces of the cooling equipment or mixing apparatus thereby decreasing the heat exchange rate of the heat exchanger or cooling vessel. This causes the formation of non-uniform crystal sizes and, in addition, as the crust is periodically scraped from the cooling surfaces, pieces of the crust remain in the mixture, and a homogenized mixture with a fine suspension of salt hydrate is difficult to achieve. Therefore, a preferred embodiment of the preparation process of this invention is to bring about the formation of a controlled amount of salt hydrate crystals in equilibrium with the salt hydrate melt by substituting a portion of the water, intended to hydrate the anhydrous latent heat storage precursor salt, with ice thereby producing a controlled amount of salt hydrate crystals from the salt solution and anhydrous salt without the disadvantages of the hereinbefore mentioned methods for the formation of salt hydrate from a mix of salt hydrate melt. As the ice melts, the internal energy of the water system increases thereby absorbing a portion of the heat of crystallization of the salt hydrate. Stated differently, the heat of fusion of the ice is supplied by the heat of crystallization of the salt hydrate. Also as the ice melts, it supplies the remaining anhydrous salt in the mix with water of crystallization.

Many heat or cold storage salt hydrates suitable for use in the present invention are noticeably susceptible to supercooling (i.e., cooling below the freezing point without inception of crystallization). A supercooled condition can be reversed by high frequency vibrations applied to the composition during use, i.e., with a mechanical vibrator; however, this is a very inconvenient method. Another solution to the supercooling problem is the incorporation of an isomorphous nucleating agent into the salt hydrate-cement composition prior to or following the hardening of the composition. A suitable nucleating agent must reliably inoculate the melt with nuclei thereby bringing about crystallization of the salt hydrate at or slightly below its freezing temperature. In addition, the nucleating agent must be insoluble in the melt and have a higher melting temperature than that of the salt hydrate.

Borax is the preferred nucleating agent for sodium sodium sulfate decahydrate or any salt hydrate mixture containing sodium sulfate, such as $Na_2SO_4$ $NaCl.10-H_2O$. However, hydraulic cement in the presence of borax cures very slowly, and the hydrated cement component takes an impractically long period of time to form. Distributing borax uniformly throughout the system is, therefore, much less practical by this method.

A preferred embodiment of this invention avoids the hereinbefore noted inhibition of cure of the hydraulic cement component when said inhibition is caused by a cure inhibiting nucleating agent, such as borax, by avoiding the even distribution of said nucleating agent throughout the composition before the hydraulic cement component cures. This preferred embodiment has discrete zones located in the composition wherein said zones are filled with the nucleating agent.

Crystallization of the salt hydrate in contact with the zones of nucleating agent induces further crystallization of salt hydrate throughout the salt hydrate-cement composition due to the continuous phase nature of the salt hydrate component which ensures contact throughout the whole of the composition. The zones can be formed in many different ways. One way of providing nucleating zones is to form holes in the salt hydrate-cement composition after transferring the composition into suitable containers, packages, or envelopes, but before hermetically sealing the containers, packages, or envelops, while the composition is still soft, or, after hardening of the composition, by drilling, or by casting the holes. These holes are then filled with a nucleating agent or a nucleating agent-salt hydrate mixture after which the containers, packages, or envelopes are hermetically sealed. A mixture of nucleating agent and salt hydrate of the type used within the heat or cold storage composition induces crystallization of the salt hydrate continuous phase more readily than the nucleating agent alone due to the fact that the nucleating agent is thereby in more intimate contact with the salt hydrate. The nucleating mixture may contain 10–100 percent of nucleating agent, preferably 40–60 percent with the balance being salt hydrate of the same type being used throughout the heat or cold storage composition.

Another way of supplying a nucleating zone is to leave a discrete space at the top of the heat or cold storage composition in the container, package, or envelope, holding said composition; this space is then filled with the nucleating agent, the nucleating agent-salt hydrate mixture or a curable composition containing a nucleating agent, after which the container, package, or envelope is hermetically sealed. The nucleating agent should not interfere with the cure of a curable nucleating capping composition. An example of such a composition is a mixture of Perlite containing about 20 percent of sodium silicate solution. The nucleating agent is mixed with this friable composition and the resulting material is compressed into the space left above the heat or cold storage composition after the latter has hardened sufficiently. This capping composition then cures to a structure with channels that intercommunicate with each other and with the heat or cold storage composition.

After the nucleating agent has been introduced within the composition by one of the hereinbefore described methods, the container, package, or envelope is hermetically sealed to prevent any loss of water during subsequent use. A gas or vapor impervious container, package, or envelope must be used to prevent loss of water from the composition. Metal containers may be used and since the composition of the present invention inhibits or prevents corrosion of steel, steel containers are easily adapted for use with the present invention. Aluminum foil laminates in which the foil is between thermoplastic layers which are used for heat sealing and protecting the foil layer may also be used. Metal layers are needed to provide zero water vapor transmission, although plastic containers with sufficiently low water vapor transmission rates may be used.

Useful in this invention are any salt hydrates or salt hydrate mixtures with a latent heat of fusion greater than 16 gram. cal. per gram (67 joules per gram). Following is a list of examples and are examples only, not intended to be construed as restrictive but rather illustrative in nature.

Typical single salt hydrates are:

| | |
|---|---|
| Calcium chloride hexahydrate | $CaCl_2 . 6H_2O$ |
| Calcium nitrate tetrahydrate | $Ca(NO_3)_2 . 4H_2O$ |
| Disodium phosphate dodecahydrate | $Na_2HPO_4 . 12H_2O$ |
| Sodium sulfate decahydrate | $Na_2SO_4 . 10H_2O$ |
| Sodium thiosulfate pentahydrate | $Na_2S_2O_3 . 5H_2O$ |
| Aluminum nitrate octahydrate | $Al(NO_3)_3 . 8H_2O$ |

Typical salt hydrate mixtures are:

| | |
|---|---|
| Sodium sulfate-sodium chloride decahydrate | $Na_2SO_4 . NaCl . 10H_2O$ |
| Sodium sulfate-½ sodium chloride-½ ammonium chloride decahydrate | $Na_2SO_4 . \frac{1}{2}NaCl . \frac{1}{2}NH_4Cl . 10H_2O$ |
| Sodium sulfate-ammonium chloride decahydrate | $Na_2SO_4 . NH_4Cl . 10H_2O$ |
| Sodium sulfate-potassium chloride decahydrate | $Na_2SO_4 . KCl . 10H_2O$ |
| Sodium sulfate-potassium nitrate decahydrate | $Na_2SO_4 . KNO_3 . 10H_2O$ |

Typical eutectic mixtures are:
$CaCl_2-MgCl_2.12H_2O$
$Mg(NO_3)_2.6H_2O—Al(NO_3)_3.9H_2O$
$Mg(NO_3)_2.6H_2O—Mg(NO_3)_2.2H_2O$ The intimately intermixed and intertwined relationship between the continuous phase latent heat polyphase heat or cold storage salt hydrate component and the continuous phase hydrated hydraulic cement component of the present invention prevents any solid salt separation of the heat or cold storing component which would otherwise display an incongruent melting point with resulting loss of heat or cold storage capacity. In other words, within the present invention, latent heat storage salt hydrate components are constrained to exhibit non-deteriorating heat or cold storage capacity on cyclical melt-freeze conditions by virtue of their association with the hydraulic cement component in an intimately intermixed and intertwined component in an intimately intermixed and intertwined continuous relationship. In effect, the intimately intermixed polyphase composition provides a congruently melting latent heat storage material from incongruently melting latent heat storage salt hydrate material, even after cycling through the melting point for years.

The ability of the composition to conduct heat into and out of the composition is reflected by the thermal conductivity of the composition with the salt hydrate in the solid and/or liquid stage. If higher thermal conductivity of the composition of the present invention is deemed necessary a suitable material with high thermal conductivity, such as metal fibers, may be incorporated within the composition during the mixing step of the manufacturing process of the present invention. These fibers will not settle out as they would in a purely liquid thermal storage material.

The packaged heat or cold storage composition must act as a heat exchange body as well as a heat or cold storage body. It is important, therefore, that the heat or cold storage composition maintain good thermal contact with the inside surface of the packaging material since gaps at this surface will effectively act as insulating media. The salt hydrate-cement composition of this invention has a very important property of expanding slightly during cure and initial use. This slight expansion ensures that good thermal contact is attained.

Suitable for use in the present invention are commonly used cements possessing hydraulic characteristics, that is, having the property of hardening by reaction with water. Ordinary portland cement is the most commonly used variety and finds widespread useage for construction purposes. High alumina cement is also a commonly available hydraulic cement suitable for use in the present invention and chemically, is substantially different from portland cement. Portland cements are prepared by sintering fixed proportions of limestone or chalk with clay in a kiln at very high temperatures. The resulting clinker is ground to a fine powder and contains reactive silicates which impart the hydraulic qualities to the cement. Other raw ingredients substituted for or used in conjunction with those already mentioned include cement rock, oyster shells, marl, shale, blast furnace slag, gypsum, sand, sandstone, and iron-containing material. A typical portland cement analysis is:

| Component | Percentage |
|---|---|
| $3CaO . SiO_2$ | 50 |
| $2CaO . SiO_2$ | 25 |
| $3CaO . Al_2O_3$ | 10 |
| $4CaO . Al_2O_3 . Fe_2O_3$ | 5 |

Minor quantities of other oxides are present, i.e., iron oxide (less than 10 percent) without noticeably affecting other properties.

Minor modifications of composition or preparation produce portland cements with special properties. For example:

Type I is for general use when the specific properties specified for the other types are not needed.

Type II or moderate heat of hardening cement is for use where exposure to moderate sulfate action is anticipated or moderate heat of hydration is required.

Type III or high early cement is for use when high early strength is needed.

Type IV or low heat cement is for use when low heat of hydration is needed.

Type V or sulfate resistant is for use when high sulfate resistance is required.

All are basically the same formulation in which minor modifications in composition or preparation produce the desired characteristics of the particular type. For example, according to the American Society For Testing Materials (ASTM) specification C-150-53, the maximum allowable percent $3CaO.Al_2O_3$ for the various types is as follows:

Type I Not specified.
Type II 8%
Type III 15%
Type IV 7%
Type V 5%

Other types of portland cements include: white portland cement produced by limiting the ferric iron content; oil well cements produced by limiting the tricalcium aluminate to near zero percent or by adding an early set retarder; air entrained cements which produce a mortar containing about 13% entrained air.

High alumina cements are produced by firing limestone or chalk (calcium carbonate) with bauxite and grinding the resulting clinker to a fine powder. The principal component of high alumina cement is $CaO—Al_2O_3$ but may contain up to twenty percent iron oxide.

Masonry cements commonly include portland cement mixed with burnt lime or limestone but may include hydraulic limes, hydrated limes, blast furnace slag cements and portland cements with water repellent or air entraining admixtures.

European countries produce several variations of hydraulic cements resembling portland cement but which include additional ingredients to reduce cost and/or make use of waste products. For example: "Silikate" cement is produced in Sweden by grinding portland clinker with a siliceous admixture; "Ersatz" cement is produced by grinding portland clinker with slags or limestone; "Trass" or pozzolona cement is produced by mixing portland clinker with a pozzolonic material; "Gaize" cement is produced in France by mixing portland clinker with a burned or unburned powdered siliceous rock known as gaize. Iron ore or erz cement is produced in Germany by substituting iron ore for the clay or shale normally used in manufacturing portland cement; "Ferrari" cement produced in Italy or France is similar to the "Ersatz" cement of Germany. Various slag cements are produced by mixing slag with portland clinker. Slag, with a high glass content, is a hydraulic binder and contributes hydraulic characteristics to slag cements. Lime-slag cement is produced in several European countries by mixing slaked lime with finely ground blast furnace slag. "Sur Sulfate" cement is produced in small amounts in a few European cement plants by grinding together approximately 80 percent specially selected granulated blast furnace slag, 15 percent gypsum and 5 percent portland clinker. A high alumina cement, known as "Kuhl" or "Bauxitland" cement is produced in Europe by substituting the clay or shale used in producing portland clinker with bauxite (hydrated aluminum oxide).

All hydraulic cements are suitable for use in the present invention including high alumina cements, although superior results have been obtained with the use of portland cement and related variations. This can be attributed to the unique microstructure and stability of the hydrated portland cement. The hydration of the two principal compounds $3CaO.SiO_2$ and $2CaO.SiO_2$ is responsible for the development of the principal strength of hydrated portland cement. These two silicates compose approximately 75% by weight of the anhydrous clinker and their hydrated form occupies about 70 percent by volume of the hydrated cement. These materials produce the largest percentage of binding between the unreacted materials and other products of hydration which include crystallized calcium hydroxide and to a lesser extent complex aluminum hydrates.

When water is mixed with an anhydrous portland cement powder, the cement particles form an initial amorphous gelatinous coating of hydrated material. This gelatinous coating produces an initial set or coagulation by forming a network of weak bonds at the point of contact between the cement grains. During the manufacturing process of the present invention after the mixing is discontinued, but before the composition solidifies, the initial gelatinous coating over the cement particles and coagulation aids in preventing the settling out of the suspended heat or cold storage salt hydrates, salts, and cement particles while allowing enough mobility of the composition for easy transfer into suitable containers, packages, or envelopes. This is a very important stage in the manufacturing process of the present invention since un-hydrated salt must be kept in uniform and stoichiometric contact with solution and salt hydrate as the un-hydrated material becomes hydrated. With continued contact between the water and cement particles the amorphous gelatinous product of hydration or "cement glue" continues to form and after three to five hours develops many vermiform protrusions. These protrusions continue to develop even after several years and are products of hydration of the two main ingredients of portland cement. The conversion of this colloidal gelatinous hydrate product or "cement glue" into a continuous phase structure is responsible for the development of strength throughout the composition. It is largely amorphous and even after many years, fails to give clear evidence of crystal structure by means of x-ray defraction. As the interwoven vermiform protrustions of "cement glue" develop to a continous phase, they become intimately intermixed and interfused with the salt hydrates and eventually consolidate to form a solid but slightly flexible matrix binding the residual unreacted cement particles, by-products, and salt hydrates into an intimately intermixed and interfused polyphase mass, effectively holding and keeping in suspension the salt hydrate and permanently preventing any un-hydrated salts from settling out during heat and cold cycling of the composition during use, while allowing enough mobility so that the noncontinuous nucleating component still has the desired effect of nucleating the latent heat-storage salt hydrates throughout the composition.

The use of hydraulic cement characterized by high alumina cement in the present invention has been successful but the higher costs of these cements and their tendency to deteriorate by a process known as conversion, limit their desirability. When water is mixed with high alumina cement powder, an initial gelatinous coating forms on the cement particles similar in appearance to the initial coating that forms on portland cement particles and produces an initial set or coagulation with characteristics similar to the initial coagulation of portland cements. The high alumina cements harden much more rapidly than the portland cements and, unlike the portland cements, the products of hydration take on more conventional crystallized form.

The principal constituent of high alumina cement is $CaO.Al_2O_3$ and under normal conditions the hydration of this substance yields $CaO.Al_2O_3 10H_2O$ and to a lesser extent the octahydrate. These products of hydration are faceted crystalline aluminates with hexagonal or acicular outlines. When high alumina cements are used in the manufacturing process of the present invention, these products of hydration of the cement form an interlocked continuous phase with the latent heat storage constituent left as an intertwined continuous phase, similar to the portland cement composition. A potential problem with high alumina cements is the metastable characteristics of its principal hydration products. These deca- and octahydrates tend, over a period of time, to convert to the stabler hexahydrate $3CaO.Al_2O_3.6H_2O$. This process changes the shape and density of the crystals present in a hydrated high alumina cement.

As hereinbefore stated, the process for manufacturing the composition of the present invention includes the following steps:

a. Mixing together anhydrous hydraulic cement, anhydrous latent heat storage precursor, and water to form a suspension;

b. Mixing said suspension with cooling until enough hydration of cement and latent heat storage precursor has taken place so that the suspended components will remain suspended when the mixing is stopped;

c. Transferring the suspension into a vapor impermeable package, envelope, or container;

d. Hermetically sealing the vapor impermeable container, envelope, or package.

In some cases, (i.e., to reduce the cost of the composition or to improve the strength of the composition) various admixtures have been included within the composition during the manufacturing process to either supplement the action of the hydraulic cement component within the composition or to replace a portion of the hydraulic cement component.

The definition of the term "admixture", as used herein, is meant to include the definition of the term as commonly used by the hydraulic cement and concrete industry. Admixtures are ingredients added to a concrete mixture other than portland cement, high alumina cement, aggregates or water. Admixtures usually fall within one of the following classes:

A. Air-entraining admixtures to improve workability and increase durability such as salts of triethanolamine and Vinsol resin.

B. Accelerators to speed hardening and strength such as calcium chloride, alkali silicates, akali carbonates, fluosilicates, and triethanolamine.

C. Retarders and water reducers such as lignosulfonic acid or hydroxylated carboxylic acids and the salts of these acids.

D. Finely divided mineral admixtures such as relatively chemically inert materials including ground quartz, ground bentonite, ground limestone, ground hydrated lime, and ground talc; cementitious materials such as natural cements, hydraulic limes, slag cements and granulated blast furnace slag; pozzolans such as fly ash, ground volcanic glass, ground diatomaceous earth, ground shale, ground clays, ground blast furnace slag, ground brick, ground opals and highly opaline rocks, ground volcanic tuff, and ground pumicite.

The cementitious admixtures are hydraulic binders and contribute hydraulic characteristics to the composition. The pozzolans, such as fly ash, react with the hydrated hydraulic portland cement by-product calcium hydroxide contributing to the composition's physical strength, while reducing the cost of the composition.

These admixtures are included within the composition of the present invention during the first step of the manufacturing process, i.e., the mixing together of the raw ingredients of the composition before the composition is transferred into suitable packages, envelopes, or containers.

Following is a list of examples for the manufacture of the compositions of the present invention and are examples only, not intended to be construed as restrictive, but rather illustrative in nature.

EXAMPLE 1

Plastic and Aluminum Foil Laminate Cylinders 30.8 parts of sodium sulfate was mixed with 39.2 parts of water with cooling to form 70 parts sodium sulfate decahydrate crystals. 23.4 parts of type II portland cement and 6.6 parts of water was added to the crystals with continued mixing to form a grainy thixotropic mass. This was then transferred into cylinders constructed of a laminate of polypropylene, aluminum foil, and polyester film. After 8 hours, the mixture had solidified sufficiently so that a hole could be produced in the mixture which was packed with a mixture of 50% borax and 50% sodium sulfate decahydrate after which the cylinders were hermetically sealed. After one weeks curing time these cylinders were cycled for over 1000 heat-cool cycles through the melting point of sodium sulfate decahydrate after which a calorimetric latent heat content determination revealed a latent heat storage content of 75.6 BTU's per pound (175.8 joules per gram).

EXAMPLE 2

Rectangular Blocks 49.2 parts of water was mixed with 35.2 parts of sodium sulfate and 15.6 parts of type II portland cement. The mixture was cooled with continued mixing until sufficient hydration of both the sodium sulfate and the cement occurred to increase the viscosity of the mix to the point where all the ingredients of the mix remained in suspension even after cessation of mixing. The composition was then transferred into open topped galvanized steel boxes and allowed to cure for eight hours after which three equally spaced bore holes were prepared ¼ in. in diameter and 4 inches deep. After 24 hours, a borax-sodium sulfate decahydrate mixture was added to the bore holes. Next, the boxes were hermetically sealed by soldering glavanized steel caps over the open tops of the boxes.

After curing for a week, a calorimetric latent heat content determination revealed a latent heat content of 201 joules per gram even after 600 melt-freeze cycles.

EXAMPLE 1

Steel Cylinders

Several steel tubes, 4 inches in diameter by 16 inches long, and several steel tubes, 4 inches in diameter and 48 inches long, were sealed on one end by soldering on steel slip covers. 54.3 parts water was mixed with 41.8 parts sodium sulfate and 3.9 parts of type II portland cement. The mixture was cooled with continued mixing until sufficient hydration of the sodium sulfate and cement occurred to increase the viscosity of the mix to the point where all the ingredients of the mix remained in suspension even after cessation of mixing. The composition was then transferred into the steel tubes and allowed to cure for eight hours after which one bore hole per cylinder was prepared ½ inch in diameter and 6 inches deep. After 24 hours a 50—50 borax-sodium sulfate decahydrate mixture was packed into each bore hole. Next, the cylinders were hermetically sealed by soldering steel slip covers in place over the open ends of each cylinder.

After curing for a week, a calorimetric latent heat determination revealed a latent heat content of 238.5 joules per gram even after 50 heat-cool cycles through the melting point of the sodium sulfate decahydrate.

EXAMPLE 4

Low Temperature Samples

Heat storage units useful in applications where the heat must be transferred at a lower temperature (i.e., greenhouse, cold storage, etc.) require a latent heat storage component with a melting point in the range of 45 to 70 degrees Fahrenheit. To this end, 30.45 parts of water was mixed with 35.2 parts of sodium sulfate, 14.5 parts of sodium chloride, and 15.6 parts of type II portland cement. After a few minutes, 18.75 parts of ice was added with continued mixing over a period of a ½ hour. Next, the composition was transferred into polyethylene bottles and allowed to cure for 24 hours after which 1.5 parts of borax was packed over the surface of the composition completely filling the bottles. The bottles were then hermetically capped and the composition was allowed to cure for a week. The latent heat capacity of the samples was measured by cooling the samples in a refrigerator to a predetermined temperature and then placing samples in a thermos with a specific amount of hot water. By monitoring the temperature changes of the water, the heat capacity of the samples were calculated to be 138 joules per gram. The operating temperature of these samples was 19° C.

In several of the examples hereinbefore cited the nucleating component utilized was substituted for by a mixture of perlite containing a sodium silicate solution and borax. The performance of these samples was the same as those samples in which borax or a mixture of borax and sodium sulfate decahydrate was used.

One use of the latent heat storage compositions of the present invention is in storage wall systems as described in "Solar Energy Thermal Processes", p. 322, by John A. Duffie and William A. Beckman, John Wiley and Sons, 1974. In this application, one wall of a house, facing south, consists of glass, an interior space, then an interior wall of blackened heat storage structure (in this case, for example, stacks of blackened containers containing the latent heat storage composition). During exposure to the sun, the heat storage wall will fill with heat and during the night, air circulating over the structure is used to heat the house.

Another use for the latent heat storage compositions of the present invention is for storing "cold" for summer cooling purposes. It may be advantageous to use a latent heat storage composition in which the latent heat storage component has a melting point between 45 degrees Fahrenheit and 72 degrees Fahrenheit, for example, the sodium sulfate-sodium chloride decahydrate composition which melts at 64 dgrees Fahrenheit, or the sodium sulfate-potassium chloride decahydrate which melts at 45 degrees Fahrenheit. During the day, the warm air from the dwelling (at a temperature greater than the melting point of the latent heat storage component) is passed over the containers of frozen latent heat storage composition which are stacked in an insulated plenum; the emerging cooled air is returned to the dwelling. At night, the air from the dwelling is passed through a collector system which radiates heat to the night sky. The cooled air is passed through the heat storage plenum to freeze the latent heat storage component.

Another important use for these lower melt temperature compositions, such as the one just described, is suitable for daytime cooling and nighttime heating of greenhouses. During the day, in the middle of winter, the temperature of a greenhouse can soar dramatically because of the incoming solar radiation. Normally, the greenhouse would be ventilated, allowing valuable heat to escape. By circulating the greenhouse air over containers holding the latent heat storage composition of the present invention, stacked in a plenum, the temperature in the greenhouse is held down to acceptable levels. During periods of little or no solar radiation, the air circulating through the plenum is kept warm by the latent heat of the latent heat storage composition as the latent heat storage component freezes.

Still another very important use for the latent heat storage compositions of the present invention is in conjunction with heat pumps. Heat pumps are very valuable devices for heating dwellings, in that, given a temperature significantly higher than outdoor freezing temperatures, the heat pump will have a coefficient of performance as high as 3. That is, three times as much energy in the form of heat is delivered to the dwelling as the electrical energy used to run the heat pump. The heat is extracted from the heat pump source (normally outside air) for delivery in the dwelling. The coefficient of performance drops to 1, however, as the outside temperature drops to freezing.

The heat stored in a heat storage unit is useful as a source of heat for the heat pump, particularly in a house designed for passive heating. Thus, if the house air, heated by solar radiation, as in the greenhouse, is circulated over the heat storage containers, the temperature of the air can be evened out. At night, ambient air is led into the heat storage unit where it is warmed up and then used as a heat source for the heat pump.

This invention is not to be construed as limited to the embodiments disclosed herein since these are illustrative in nature and are not intended to be restrictive.

I claim:

1. A polyphase latent heat storage composition useful for the storage of heat or cold, comprising a latent heat storage component with a heat of fusion greater than 16 gram calories per gram (67 joules per gram) wherein said latent heat storage component is intimately intermixed with a hydrated hydraulic cement component.

2. the composition of claim 1 wherein the latent heat storage component comprises between 97 and 10 percent by weight of said composition.

3. The composition of claim 1 wherein said hydrated hydraulic cement component is a hydrated portland cement.

4. The composition of claim 1 wherein said hydrated hydraulic cement component is a hydrated high alumina cement.

5. The composition of claim 1 wherein said latent heat storage component comprises a single salt hydrate.

6. The composition of claim 1 wherein said latent heat storage component comprises a mixture of salt hydrates.

7. The composition of claim 1 wherein said latent heat storage component is $CaCl_2.6H_2O$.

8. The composition of claim 1 wherein said latent heat storage component is $Ca(NO_3)_2.4H_2O$.

9. The composition of claim 1 wherein said latent heat storage component is $Na_2HPO_4.12H_2O$.

10. The composition of claim 1 wherein said latent heat storage component is $Na_2SO_4.10H_2O$.

11. The composition of claim 1 wherein said latent heat storage component is $Na_2S_2O_3.5H_2O$.

12. The composition of claim 1 wherein said latent heat storage component is $Al(NO_3)_3.8H_2O$.

13. The composition of claim 1 wherein said latent heat storage component is $Na_2SO_4.NaCl.10H_2O$.

14. The composition of claim 1 wherein said latent heat storage component is $Na_2SO_4.1/2NaCl.1/2NH_4Cl.10H_2O$.

15. The composition of claim 1 wherein said latent heat storage component is $Na_2SO_4.NH_4Cl.10H_2O$.

16. The composition of claim 1 wherein said latent heat storage component is $Na_2SO_4.KCl.10H_2O$.

17. The composition of claim 1 wherein said latent heat storage component is $Na_2SO_4.KNO_3.10H_2O$.

18. The composition of claim 1 wherein said latent heat storage component is $CaCl_2\text{-}MgCl_2.12H_2O$.

19. The composition of claim 1 wherein said latent heat storage component is $Mg(NO_3)_2.6H_2O\text{-}Al(NO_3)_3.9H_2O$.

20. The composition of claim 1 wherein said latent heat storage component is $Mg(NO_3)_2.6H_2O\text{-}Mg(NO_3)_2.2H_2O$.

21. The composition of claim 1 wherein a nucleating agent is included within said composition in a discontinuous phase.

22. The composition of claim 1 wherein said composition has discrete zones containing a nucleating agent.

23. The composition of claim 1 wherein a thermal conductive material with a thermal conductivity value greater than the conductive value of the composition is interspersed throughout said composition.

24. The composition of claim 1 wherein said composition is enveloped within a vapor impermeable material.

25. The composition of claim 1 wherein an admixture is included within said composition.

26. The composition of claim 6 wherein said mixture of salt hydrates is a eutectic mixture.

27. The composition of claims 21 or 22 wherein said nucleating agent is borax.

28. The composition of claims 21 or 22 wherein said nucleating agent is a mixture of borax and interacted perlite-sodium silicate.

29. The composition of claim 23 wherein said thermal conductive material is metal fibers.

30. The composition of claim 24 wherein said vapor impermeable material is steel.

31. The composition of claim 24 wherein said vapor impermeable material is galvanized steel.

32. The composition of claim 24 wherein said vapor impermeable material is a laminate of plastic film and metal foil.

33. The composition of claim 24 wherein said vapor impermeable material is a plastic.

34. The composition of claim 24 wherein said vapor impermeable material is a laminate of polypropylene film, aluminum foil, and polyethylene terephthalate.

35. The composition of claim 25 wherein said admixture is a salt of triethanolamine.

36. The composition of claim 25 wherein said admixture is vinsol resin.

37. The composition of claim 25 wherein said admixture is calcium chloride.

38. The composition of claim 25 wherein said admixture is alkali silicates.

39. The composition of claim 25 wherein said admixture is fluosilicates.

40. The composition of claim 25 wherein said admixture is alkali carbonates.

41. The composition of claim 25 wherein said admixture is triethanolamine.

42. The composition of claim 25 wherein said admixture is lignosulfonic acid.

43. The composition of claim 25 wherein said admixture is salts of lignosulfonic acid.

44. The composition of claim 25 wherein said admixture is hydroxylated carboxylic acid.

45. The composition of claim 25 wherein said admixture is salts of hydroxylated carboxylic acid.

46. The composition of claim 25 wherein said admixture is ground quartz.

47. The composition of claim 25 wherein said admixture is ground bentonite.

48. The composition of claim 25 wherein said admixture is ground limestone.

49. The composition of claim 25 wherein said admixture is ground hydrated lime.

50. The composition of claim 25 wherein said admixture is ground talc.

51. The composition of claim 25 wherein said admixture is natural cements.

52. The composition of claim 25 wherein said admixture is hydraulic limes.

53. The composition of claim 25 wherein said admixture is slag cements.

54. The composition of claim 25 wherein said admixture is granulated blast furnace slag.

55. The composition of claim 25 wherein said admixture is fly ash.

56. The composition of claim 25 wherein said admixture is ground volcanic glass.

57. The composition of claim 25 wherein said admixture is ground diatomaceous earth.

58. The composition of claim 25 wherein said admixture is ground shale.

59. The composition of claim 25 wherein said admixture is ground clays.

60. The composition of claim 25 wherein said admixture is ground opals and highly opaline rocks.

61. The composition of claim 25 wherein said admixture is ground brick.

62. The composition of claim 25 wherein said admixture is ground volcanic tuff.

63. The composition of claim 25 wherein said admixture is ground pumicite.

64. A process for the manufacture of a polyphase latent heat storage composition which comprises:
   a. Mixing together anhydrous hydraulic cement, anhydrous latent heat storage precursor, and water, to form a suspension;
   b. Mixing said suspension with cooling until enough hydration of the hydraulic cement and latent heat storage precursor has taken place so that the suspended components will remain suspended when said mixing is stopped;
   c. Transferring said suspension into an open vapor impermeable container;
   d. Hermetically sealing said vapor impermeable container.

65. The process of claim 64 wherein a portion of the water is substituted by ice thereby producing a controlled amount of salt hydrate crystals within the mix.

66. The process of claim 64 wherein said hydraulic cement is a portland cement.

67. The process of claim 64 wherein said hydraulic cement is a high alumina cement.

68. The process of claim 64 wherein said latent heat storage precursor and water combine to form a single salt hydrate latent heat storage component.

69. The process of claim 64 wherein said latent heat storage precursor and water combine to form a salt hydrate mixture latent heat storage component.

70. The process of claim 64 wherein said latent heat storage precursor and water combine to form a salt hydrate eutectic mixture latent heat storage component.

71. The process of claim 64 wherein said latent heat storage precursor and water combine to form a latent heat storage component selected from the group consisting of:
$CaCl_2.6H_2O$
$Ca(NO_3)_2.4H_2O$
$Na_2HPO_4.12H_2O$
$Na_2SO_4.10H_2O$
$Na_2S_2O_3.5H_2O$
$Al(NO_3)_3.8H_2O$
$Na_2SO_4.NaCl.10H_2O$
$Na_2SO_4.1/2NaCl.1/2NH_4Cl.10H_2O$
$Na_2SO_4.NH_4Cl.10H_2O$
$Na_2SO_4.KCl.10H_2O$
$Na_2SO_4.KNO_3.10H_2O$
$CaCl_2-MgCl_2.12H_2O$
$Mg(NO_3)_2.6H_2O-Al(NO_3)_3.9H_2O$; and
$Mg(NO_3)_2.6H_2O-Mg(NO_3)_2.2H_2O$.

72. The process of claim 64 wherein a nucleating agent is included within the composition.

73. The process of claim 64 wherein the hydrated equivalent of the anhydrous latent heat storage precursor comprises between 97 and 10 percent by weight of the composition.

74. The process of claim 64 wherein an admixture is included within the mixture during Step "a" of said process.

75. The process of claim 64 wherein a thermal conductive material with a thermal conductive value greater than the thermal conductive value of the composition is included within the mixture.

76. The process of claim 64 wherein said vapor impermeable container is a plastic container.

77. The process of claim 64 wherein aid vapor impermeable container is a steel container.

78. The process of claim 64 wherein said vapor impermeable container is a galvanized steel container.

79. The process of claim 64 wherein said vapor impermeable container is a laminate of plastic film and metal foil container.

80. The process of claim 64 wherein said vapor impermeable container is a laminate of polypropylene film, aluminum foil, and polyethylene terephthalate.

81. The process of claim 72 wherein said nucleating agent is included in the composition only after the suspension has hardened by packing the nucleating agent over the exposed surface of the latent heat storage composition so as to fill any empty space in the container before hermetically sealing and container.

82. The process of claim 72 wherein said nucleating agent is included within the composition during the formation of the suspension.

83. The process of claim 72 wherein the composition has discrete zones containing said nucleating agent, and wherein said discrete zones are formed in the composition after the suspension has hardened by boring or molding a hole into the exposed surface of the latent heat storage composition and filling said hole with a nucleating agent before hermetically sealing said container.

84. The process of claim 72 wherein said nucleating agent is borax.

85. The process of claim 72 wherein said nucleating agent is a mixture of borax and interacted perlite-sodium silicate.

86. The process of claim 74 wherein said admixture is selected from the group consisting of:
Salt of triethanolamine
Vinsol resin
Calcium chloride
Alkali silicates
Fluosilicates
Alkali carbonates
Triethanolamine
Lignosulfonic acid
Salts of lignosulfonic acid
Hydroxylated carboxylic acid
Salts of hydroxylated carboxylic acid
Ground quartz
Ground bentonite
Ground limestone
Ground hydrated lime
Ground talc
Natural cements
Hydraulic limes
Slag cements
Granulated blast furnace slag
Fly ash
Ground volcanic glass
Ground diatomaceous earth
Ground shale
Ground clays
Ground opals and highly opaline rocks
Ground brick
Ground volcanic tuff; and
Ground pumicite.

87. The process of claim 75 wherein said thermal conductive material is metal fibers.

* * * * *